United States Patent [19]
Bennett et al.

[11] Patent Number: 5,686,204
[45] Date of Patent: Nov. 11, 1997

[54] GELLING AGENT FOR ALKALINE ELECTROCHEMICAL CELLS

[75] Inventors: Patricia S. Bennett, Madison; Kenneth H. Kenyon, Verona; Alane M. Boutelle; Janna L. Rose, both of Madison; Ronald J. Ekern, Verona; Randall L. Collien, Fitchburg, all of Wis.

[73] Assignee: Rayovac Corporation, Madison, Wis.

[21] Appl. No.: 594,573

[22] Filed: Jan. 31, 1996

[51] Int. Cl.⁶ .................................................. H01M 4/62
[52] U.S. Cl. .................... 429/217; 429/231; 29/623.1
[58] Field of Search .................... 429/215, 217, 429/218, 229; 29/623.1

[56] References Cited

U.S. PATENT DOCUMENTS

| | | |
|---|---|---|
| 3,207,633 | 9/1965 | Meltzer et al. |
| 4,376,810 | 3/1983 | Takeda et al. ............ 429/90 |
| 4,525,527 | 6/1985 | Takeda et al. |
| 4,703,067 | 10/1987 | Mikita et al. |
| 4,820,742 | 4/1989 | Alexander et al. |
| 4,963,447 | 10/1990 | Nishimura et al. |
| 4,970,267 | 11/1990 | Bailey et al. |
| 5,128,222 | 7/1992 | Yoshizawa et al. |
| 5,168,018 | 12/1992 | Yoshizawa et al. ............ 429/190 |
| 5,312,476 | 5/1994 | Uemura et al. |
| 5,401,590 | 3/1995 | Chalilpoyil et al. |
| 5,447,809 | 9/1995 | Hafner et al. |

FOREIGN PATENT DOCUMENTS

| | | |
|---|---|---|
| 0414990A1 | 3/1991 | European Pat. Off. |
| 0678927A1 | 10/1995 | European Pat. Off. |

OTHER PUBLICATIONS

Vassallo et al., "Synthetic and Natural Polymers," *Absorbency* Ch. VI, 197–216 (1985) (month not available).

Primary Examiner—M. Nuzzolillo
Attorney, Agent, or Firm—Quarles & Brady

[57] ABSTRACT

A potassium polyacrylate superabsorbent polymer made by modified bulk polymerization and characterized as described herein is a superior gelling agent when provided at a suitable concentration in a gelled anode for an alkaline electrochemical cell. Suitable gelled anodes, alkaline electrochemical cells containing such gelled anodes, and methods for making and using same are also described.

35 Claims, 1 Drawing Sheet

GELLING AGENT FOR ALKALINE ELECTROCHEMICAL CELLS

FIELD OF THE INVENTION

The present invention relates to alkaline electrochemical cells and particularly to a novel gelling agent in the anode portion of the alkaline cell.

BACKGROUND OF THE INVENTION

The basic structure of a primary alkaline electrochemical cell is known. Generally speaking, alkaline cells include a positive electrode ("cathode") that receives electrons from a negative electrode ("anode") that releases electrons. The cathode is joined to a positive terminal of the battery by a collector rod. The negative electrode is typically a high-surface area metal such as zinc. The anode metal is provided in an electrolyte solute, such as potassium hydroxide, which is the ion transfer medium between the anode and the cathode. A separator which passes ions, but not electrons is placed between the electrodes. Other aspects of a typical alkaline cell are described elsewhere in the specification.

It is common in the art to provide a gelled anode wherein the gelled portion includes the anode metal, provided as a powder, an aqueous alkaline electrolyte, and a gelling agent for fixing the anode metal and electrolyte in the gel state. Conventional gelling agents include carboxymethylcellulose, crosslinking-type branched polyacrylic acid, natural gum, or the like. A typical anode metal is zinc powder.

When formulating a gelled anode, it is important to ensure that the anode remains dispersed in the gel and that the gel retains its integrity. If dispersion is reduced or if the gel experiences syneresis, the effective surface area of the anode is reduced and the anode network required for efficient ion transfer is interrupted. Contact among the particles of an anode network, or between the anode particles and the cathode current collector, can also be reduced or interrupted when an alkaline cell is dropped, jostled, or vibrated. This shock sensitivity is a particularly well known problem of mercury-free alkaline cells employing crosslinking-type gelling agents. Shock sensitivity can result in a high internal resistance, a rapid decrease in cell voltage, and other problems, all of which are unacceptable to manufacturer and consumer alike. Problems resulting from erratic electrical conductivity between anode and negative current collector have been matters of particularly great concern since the industry reduced or eliminated mercury from the anode mix used in primary alkaline cells.

Another problem that can affect alkaline cells is that the zinc and the electrolyte can separate, concentrating the zinc and reducing the amount of electrolyte available for the anodic reaction at the zinc surfaces. One method for preventing this problem is to increase the viscosity of the gelled anode. However, there are practical limits on raising the viscosity, as discussed below.

As one solution to the problems associated with shock sensitivity, U.S. Pat. No. 4,963,447 (Nishimura) describes a gelled zinc anode containing a granular crosslinking-type branched polyacrylic or polymethacrylic acid gelling agent having a main particle diameter of 200 to 900 microns which concentrates the zinc into a reduced volume.

According to U.S. Pat. No. 4,963,447, the gelling agent particles are crosslinked in the presence of a mixture of a polyvalent allyl crosslinking agent with a polyvalent vinyl crosslinking agent which are then granulated during or after deposition-polymerization. U.S. Pat. No. 4,963,447 carefully recites the importance of both the particular combination of crosslinking agents (col. 3) and of the polymerization method (cols. 1 and 2). Gelling agents of comparable size obtained after mass polymerization, suspension polymerization, or emulsion polymerization are described therein to be inadequate as gelling agents because they fail to contain a sufficient volume of electrolyte and because the electrolyte is insufficiently utilized.

Although the polyacrylic and polymethacrylic acid large particle gelling agents of U.S. Pat. No. 4,963,447 were an improvement over prior gelling agents, it is now recognized that inability to control the nature of the particles results in undesired properties in gelled anodes of alkaline cells. In particular, such gelling agents increase the viscosity of the gelled anode to a high level. High viscosity materials are disfavored in battery production processes because they make it difficult to regulate the amount of the gelled anode loaded into the anodic cavity of the alkaline cell. However, at suitable lower viscosities, detrimental effects are noted, such as a zinc-electrolyte separation, decreased zinc network robustness and decreased electrical discharge performance.

Loading of a high viscosity gelled anode into the anodic cavity of a cell at high applied stress rates is easier if the gelled anode is a non-Newtonian fluid whose viscosity decreases as the rate of applied stress increases. Although a gelled anode seems stiff when at rest, it liquifies and flows easily when a stress is applied at a high rate. This concept, referred to as "shear thinning," was applied to battery anodes by Meltzer and Krebs in U.S. Pat. No. 3,207,633. As was noted by Meltzer and Krebs, the effect of shear thinning is increased, and handling during alkaline cell manufacture is improved at lower viscosities.

The manner in which the gelling agent acts to push zinc particles into spaces among its swollen particles to promote contact among the zinc particles, or between the zinc particles and the negative electrode current collector, is understood. Use of gelled anodes has been shown to improve electricity production, but existing batteries are still subject to loss of contact when dropped or vibrated. There is still considerable room for improvement in both of these areas, particularly in view of the desire to further eliminate toxic materials from primary cells. Such toxic materials as mercury had previously been used to improve cell performance and reduce shock sensitivity.

The industry has also seen a increased demand for use of such cells in high-current environments, including portable audio equipment and cameras and flashes where cells are likely to discharge faster than in previous applications and are more sensitive to erratic internal resistance.

Thus, a suitable gelling agent capable of maintaining better electrical conductivity in a gelled anode while having an acceptable viscosity lower than that previously believed necessary to maintain a superior zinc network and offer improved electrical discharge performance is highly desirable. It is also desirable that a longer battery life be achieved in combination with the other desired advantages.

SUMMARY OF THE INVENTION

The invention has certain objects. That is, this invention provides solutions to problems existing in the prior art. For example, the invention provides a gelled anode that, when compared to existing gelled anodes: (a) reduces material costs; (b) maintains its integrity in manufacturing processes; (c) achieves superior electrical discharge performance; (d) has improved anode network robustness; (e) is less subject to separation; (f) has increased reliability and physical robustness; and (g) is suitable for cells of any size that utilize gelled anodes.

The gelling agents suitable for use in the gelled anode of the present invention have less effect on viscosity than prior gelling agents. Thus, gelled anodes prepared as described herein are more readily and more reproducibly incorporated into alkaline cells. Also, a gelled anode prepared in accordance with the present invention can comprise additional gelling agents with superior results than are realized in the absence of the gelling agent described herein.

In its most basic embodiment, the invention is the recognition that a potassium polyacrylate superabsorbent polymer made by modified bulk polymerization and characterized as described herein is a superior gelling agent when provided at a suitable concentration in a gelled anode for an primary alkaline cell.

The invention is also a gelled anode comprising effective amounts of an alkaline electrolyte, a zinc powder, water and a gelling agent composed solely or mainly of the described potassium polyacrylate polymer in a suitable concentration. Optionally, the anode can contain added indium hydroxide or surfactant in suitable concentration.

The invention is also a primary alkaline cell comprising the gelled anode of the present invention. Incorporation of such a gelled anode into an alkaline cell results in the cell that exhibits superior anode network robustness and superior electrical discharge performance.

In addition, the invention is a method for forming the gelled anode of the present invention, and is a method for forming, and a method for discharging, the primary alkaline cell of the present invention.

It is a feature of the gelled anode of the present invention that it includes a crosslinked acrylic superabsorbent polymer gelling agent characterized as having carboxylic groups located on the spine of the polymer which solvate in the presence of an aqueous medium and develop mutually repulsive negative charges which cause uncoiling of the molecule, exposure of additional carboxylic groups, and absorption of additional liquid.

The invention possess certain advantages, including its simplicity, the low cost of the gelling agent, and the small number of modifications required to implement the invention in a gelled anode and in an alkaline electrochemical cell.

Other objects, features, and advantages of the invention will become apparent from the detailed description of the invention taken in conjunction with the accompanying drawing.

DETAILED DESCRIPTION OF THE INVENTION

Figure 1:
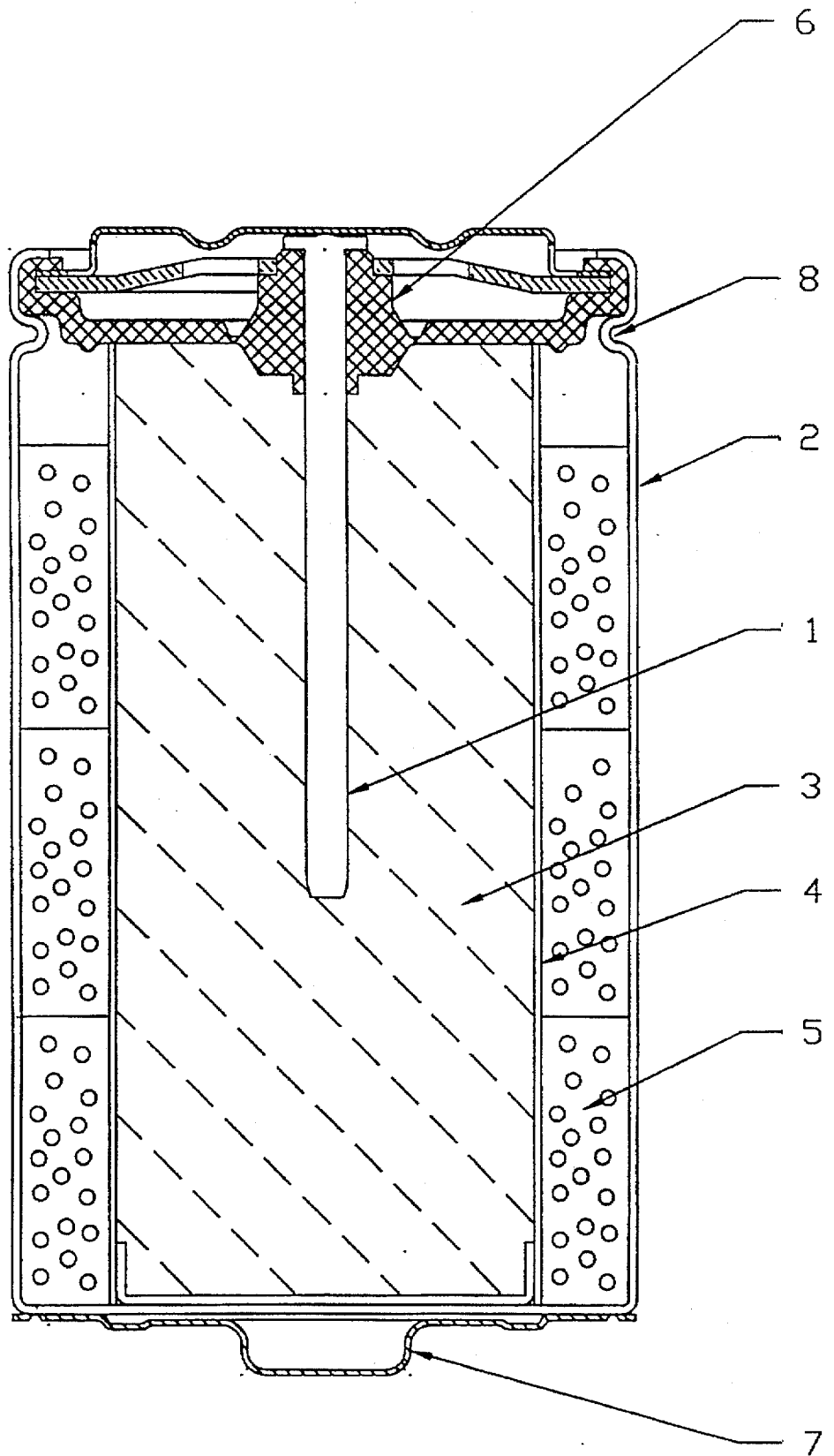
FIG. 1 is a drawing of an alkaline cell incorporating the present invention.

FIG. 1 is a cross-sectional diagram of an alkaline cylindrical battery incorporating the present invention. The battery includes a positive current collector 2, which is a drawn steel container open on one end that is about 0.012 inches thick. Three cathode annular rings 5 are placed into the positive current collector, forming a pressure contact with the positive current collector 2. A bead 8 is rolled into the container near the open end to support the sealing disk. A separator 4 and an anode 3 are placed inside of the cathode rings 5. A sealing disk 6 containing a negative current collector 1 is placed into the open end of the container and in contact with the bead. The open end of the container is crimped over the sealing disk thus compressing the sealing disk between the crimp and the bead to seal the cell. Terminal cap 7 is welded onto the positive current collector 2. Although a cylindrical cell is shown, the invention may be applied equally well to any primary alkaline cell, without regard to size or shape, including, but not limited to, sizes AA, AAA, C, D, and 9V.

The invention relates more particularly to the anode 3, which is a gelled zinc anode. The gelled zinc anode can be formed by first combining the electrolyte and a gelling agent of the type described herein to form a gelled electrolyte and then adding an effective amount of the zinc powder to the gelled electrolyte. A suitable gelled anode contains "fish eyes" and has a density of between 2.6 and 3.0 g/cm$^3$, preferably between 2.80 and 2.95 g/cm$^3$, and a viscosity between 300,000 and 500,000 cps at 0.50 rpm and between 15,500 and 21,000 cps at 50 rpm, as measured by a Brookfield viscometer model RVT with spindle #7 (used for viscosity values throughout the specification). "Fish eyes," which are named for their resemblance to fish eyes, are small swollen, insoluble particles of gelling agent which have absorbed electrolyte that help to maintain adequate contact between the anode and the negative current collector and among the zinc particles.

The zinc powder preferably has an added mercury content of less than 0.1% by weight and is most preferably mercury-free. The gelled anode also preferably contains no added lead. A Bismuth-Indium-Calcium (BIC) zinc alloy such as is described in U.S. Pat. No. 5,312,476, which is incorporated herein by reference, is suitable. The zinc component is generally about 65–68% by weight of the anode.

As is described in U.S. Pat. No. 5,168,018, incorporated herein by reference, an amount of an indium compound such as indium hydroxide adequate to effectively reduce corrosion and to promote electrical conductivity and is also provided in the gelled anode. An amount effective to promote electrical conductivity is an amount wherein a statistically significant increase in conductivity is observed in the presence of indium hydroxide over what is observed in the absence of indium hydroxide. An effective amount of indium hydroxide in the gelled anode can be less than 0.1% by weight but is preferably less than 0.05% and is most preferably 0.03%.

The alkaline electrolyte can be any electrolyte of the type known and used in the production of gelled zinc anodes and alkaline cells. The choice of electrolyte is thought to have no advantageous or disadvantageous effect upon the present invention. A suitable aqueous alkaline electrolyte is 37% potassium hydroxide/4% zinc oxide, which is a typical electrolyte in alkaline dry cells. The electrolyte is provided at about 32–34% by weight, preferably about 33%, in the anode.

An effective amount of a surfactant can be added to the anode to reduce or control gassing within the cell, in the manner provided in U.S. Pat. No. 5,128,222, incorporated herein by reference. A suitable surfactant concentration is less than 0.1%, is preferably less than 0.05% and is most preferably 0.03% or less. Other surfactant choices are known to the art, and can include those surfactants described in U.S. Pat. No. 5,128,222.

The gelling agent is, generally speaking, a cross-linked acrylic polymer. As noted, the use of a particular class of cross-linked acrylic polymer gelling agents in a gelled anode is known. See, U.S. Pat. No. 4,963,447, which is incorporated herein by reference. However, the present inventors have determined that the objects of the present invention are achieved by providing an effective amount of a distinct class of crosslinked polyacrylate superabsorbent polymer resin gelling agents that can be prepared as described herein and in U.S. Pat. No. 4,703,067 to Mikita (incorporated herein by reference) by modified bulk polymerization. These same objects are not met by the gelling agents of U.S. Pat. No. 4,963,447. Briefly, the superabsorbent cross-linked polyacrylate resin gelling agent selected by the inventors can be formed by combining potassium acrylate and a polyvinyl monomer such as N,N-methylene bisacrylamide with water in an amount of 55 to 80 weight percent potassium acrylate and polyvinyl monomer (combined amount, based on the total weight of potassium acrylate, polyvinyl monomer and water) to form a monomer mixture then adding a polymerization initiator to the monomer mixture to initiate polymerization of the monomer mixture. Suitable polyvinyl compounds and initiators are detailed in U.S. Pat. No. 4,703,067, which also describes the materials and methods in greater detail. U.S. Pat. No. 4,820,742 (Alexander), also incorporated herein by reference, describes a suitable apparatus for forming the materials disclosed in the Mikita patent.

There is no suggestion in U.S. Pat. No. 4,963,447 (Nishimura) that these materials would work in an alkaline cell. By its very terms, in fact, U.S. Pat. No. 4,963,447 teaches away from the beneficial use of such materials in the context of an alkaline cell, in that it recites that the starting materials and polymers described therein are critical to successful use. The gelling agents preferred by the present inventors are distinct polymers that are not crosslinked with the recited crosslinking agents.

A preferred large particle gelling agent, referred to herein as the preferred superabsorbent polymer (SAP), is characterized as a white, odor-free powder characterized as having a typical bulk density of 0.4, an absorption capacity of 27 g saline per g, a maximal moisture content of 8%, 600 or fewer ppm of residual acrylate monomer, and a particle size distribution of between 135 and 850 microns. The preferred SAP is insoluble in water and organic solvents. References in the tables that follow to SAP are intended to be references to the preferred SAP of the class of materials described in U.S. Pat. No. 4,703,067. The preferred SAP is commercially available from Chemdal Corporation under the trade name Aridall 1460.

The preferred superabsorbent polymer is also characterized by direct comparison to the crosslinked polymers described in U.S. Pat. No. 4,963,447 which have previously been used in the gelled anodes of primary alkaline cells. In side by side tests, the prior material, which is not a superabsorbent, exhibited lower gel strength, lower capacity for fluids, and a lower hydration rate than the preferred superabsorbent polymer. Other physical comparisons of the properties of the two gelling agents are reported in Table 1. Throughout this application, references to the prior gelling agent, or to the gelling agent of the prior art, are intended to mean the materials of U.S. Pat. No. 4,963,447.

TABLE 1

| Test | Prior | Preferred SAP |
|---|---|---|
| Vortex (sec) | 420 | 10 sec. maximum |
| A.U.L.* (g/g) | 5.4 | 20 (minimum) |
| Gel Volume (g/g) | 13.4 | 27 ± 10% |

*Absorbancy Under Load of 0.28 PSI for 1 hour

Not only are the starting materials distinct from those described in U.S. Pat. No. 4,963,447, and not only are the polymers themselves different, but the prior material also requires the input of significant thermal energy both to facilitate and to maintain the polymerization reaction to create the gelling agent. In contrast, initiation of polymerization of the present material requires some input of heat, but polymerization is exothermic and has sufficient heat of polymerization to maintain the polymerization step and to drive off excess water from the polymerized material, thereby obviating the need for a separate drying step. Moreover, the polymerization and drying are accomplished in just minutes rather than in the hours required by the method of U.S. Pat. No. 4,963,447. Because no external heating or drying is required after polymerization is initiated, a very high quality resin solid is formed that lacks irregularities in the degree of polymerization which can impair the water absorbing ability. These differences translate directly into substantial cost and time savings realized in preparing a suitable gelling agent.

Such a superabsorbent gelling agent provides improved consistency over prior large particle gelling agents prepared by deposition polymerization using different starting materials. When incorporated as a gelling agent into a gelled zinc anode of the present invention, the resin improves the shock sensitivity and zinc network robustness of primary alkaline cells. As is disclosed in the Examples below, less gelling agent is required than was required in existing gelled anode compositions to achieve comparable, and generally superior, viscosity and performance levels.

It is believed by the inventors that the unexpectedly superior gelling properties observed with the gelling agent described herein result in part from the increased and improved accessibility of the electrolyte to carboxyl groups on the polymer backbone relative to that observed when the gelling agent is the gelling agent described in U.S. Pat. No. 4,963,447, or is CARBOPOL 940 cross-linked acrylic acid copolymer absorbent. The increased accessibility has at least two components. First, the manner in which the polymer chains of the prior gelling agent are crosslinked appears to restrict or limit access to carboxyl groups, even after long periods of exposure. Thus, since only between about 25% and 30% of all carboxyl groups of the prior gelling agent are free and accessible for hydrogen bonding to the electrolyte, there is less swelling of the gelling agent, producing a gelled anode that is relatively less effective against vibration. In contrast, about 50% or more of the carboxyl groups in the gelling agent used in the present invention are in the free acid form and are available for hydrogen bonding. Thus, the preferred gelling agent shows fewer cross-links per unit weight of polymer and more free carboxyl groups than the prior gelling agent or CARBOPOL cross-linked acrylic acid copolymer absorbent, making the gelling agent a better superabsorbent with a higher swelling capacity than the prior gelling agent. Second, it appears that the preferred gelling agent uncoils more gradually in the presence of aqueous materials, providing additional access to internal sites and additional absorbance capacity.

TABLE 2

|  | Prior Art Cell | 0.58% Cbpl | 0.30% Cbpl 0.30% SAP | 0.70% SAP | 0.70% Cbpl | 0.58% Cbpl 0.12% Prior |
|---|---|---|---|---|---|---|
| Drop Test |  |  |  |  |  |  |
| Initial Amps | 11.825 | 11.651 | 12.34 | 12.245 | 11.206 | 11.183 |
| Post Amps | 4.804 | 2.158 | 9.355 | 11.437 | 1.996 | 1.523 |
| % of Initial | 41% | 19% | 76% | 93% | 18% | 14% |
| % <1 Amp |  | 20% |  |  | 30% | 60% |
| 1.8 Ohm Photo |  |  |  |  |  |  |
| 1.10v | 220 | 212 | 212 | 197 | 243 | 220 |
| 1.00v | 462 | 462 | 402 | 346 | 452 | 428 |
| 0.90v | 672 | 689 | 673 | 576 | 690 | 664 |

The preferred SAP gelling agent, prepared as described in U.S. Pat. No. 4,703,067, is also distinguishable from the prior gelling agent and from CARBOPOL 940 cross-linked acrylic acid polymer absorbent on the basis of weight loss, thermogravimetric analysis (TGA) run at a heating rate of 20° C./minute. Samples were heated up to 600° C. in argon and then from 600° to 900° C. in air to burn off any pyrolysis by-products. CARBOPOL 940 cross-linked acrylic acid polymer absorbent and the prior gelling agent, but not the preferred SAP showed similarities in inflection temperatures and the weight loss percentages, particularly in weight loss steps that occurred at about 250° C., 330° C., and 430° C. CARBOPOL 940 cross-linked acrylic acid polymer absorbent is more thermally stable than the prior gelling agent and does not begin to lose a significant amount of weight until the test temperature reaches 230° C. In contrast, the prior gelling agent loses almost 5.5% between room temperature and 230° C. The preferred SAP, however, decomposes on a completely different schedule; and between about 50 and 60% of the sample is still present when the sample reaches 700° C. Then as the temperature rises above 800° C., some of this residue begins a new decomposition step which is still in progress at 900° C.

For CARBOPOL 940 cross-linked acrylic acid polymer absorbent, and for the prior gelling agent, eighty percent of the weight loss with increasing temperature occurs before 600° C., whereas the preferred SAP loses only 40% its weight over that temperature range, suggesting a much more stable three-dimensional structure.

Additional NMR and FTIR analyses suggest the existence in the prior gelling agent of one or more additional peaks not present in the preferred SAP which may represent excess or residual monomer or cross-linking agents that may adversely affect performance.

The superiority of these gelling agents is not simply a matter of a routine choice of one superabsorbent material over another. The present inventors have undertaken rigorous analysis of a number of recognized superabsorbent materials and have determined that all superabsorbents are not adequate gelling agents, and moreover that mere substitution of one super absorbent for another does not result in anodes having comparable performance. It is necessary to modify, in an unpredictable manner, the other components in the anode to achieve desired performance when using other superabsorbents. It appears that the class of non-starch superabsorbant materials are superior to other starch-grafted co-polymers (described in U.S. Pat. No. 4,455,358) which are known to be less stable and which can be oxidized by the cathode. It is apparent to the inventors that the selected gelling agents are better absorbers of water by at least about 5% than the materials of U.S. Pat. No. 4,963,447, which improvement is dramatic, unexpected, and commercially significant in this field. This improvement is significant both in that it permits the use of less gelling agent and because discharge performance and shock resistance are improved when a better absorbent is used. In addition, it has been noted above that these materials are less expensive, less time consuming, and less difficult to formulate than those previously selected as gelling agents.

The gelling agent thus characterized can be the sole gelling agent in the zinc anode or can be included in combination with one or more additional gelling agents of the type commonly used in the art. The gelling agent can be provided in the anode at a concentration range of about 0.22% to about 1.1% by weight of the anode, depending upon whether the agent is the sole gelling agent or is provided with another gelling agent. It is envisioned that by adjusting the concentrations of other components of the gelled anode in a manner known to those skilled in the art it will be possible to extend the upper and lower suitable gelling agent amounts by about 5 or 10% of the range. When the characterized gelling agent is the sole gelling agent, it is present at between about 0.6% and about 1.1% by weight in the gelled anode, more preferably at a between 0.7% and 1.0%, and most preferably at about 0.8 to 0.9% of the weight of the gelled anode. Within these ranges, the gelled anode thus formed contains no unblended ingredients and exhibits no electrolyte separation, yet includes "fish eyes" and has a viscosity suitable for automated delivery during production of primary alkaline cells. At concentrations above about 1.1%, the gelled anode becomes too viscous for use in cell assembly processes. At concentrations below about 0.6–0.7%, the gel separates and anode stability cannot be maintained.

The characterized gelling agent can, alternatively, exhibit the same advantageous properties when present in combination with one or more additional gelling agents. When provided in combination, the combined percentage of the gelling agents should preferably be less than about 1%. For example, the gelling agent can be provided at 0.5% or less of the gelled anode by weight when CARBOPOL 940 cross-linked acrylic acid polymer absorbent is also present at less than 0.5% by weight. CARBOPOL 940 cross-linked acrylic acid polymer absorbent is a crosslinked acrylic acid copolymer used in anode gelling agents, that is an absorbent gelling agent, but is not a superabsorbent. If the SAP is provided in combination with gelling agent having a lower viscosity than CARBOPOL cross-linked acrylic acid polymer absorbent, the acceptable amount may be higher. Other CARBOPOL cross-linked acrylic acid polymer absorbents, other small-particle gelling agents, such as those described by Meltzer and Krebs, as well as other polyacrylic or cellulosic gelling agents including, for example, PW 150, sodium carboxymethylcellulose, hydroxymethylcellulose or hydroxyethylcellulose may also be combined with the gelling agent of the present invention to yield superior gelled anodes.

When CARBOPOL 940 cross-linked acrylic acid polymer absorbent is provided at about 0.5% in the anode, (e.g., 0.48%), the material of U.S. Pat. No. 4,703,067 is preferably provided at between 0.2 and 0.5%, preferably at between 0.22% and 0.4%, and most preferably at 0.22–0.3% by weight in the anode.

When CARBOPOL 940 cross-linked acrylic acid polymer absorbent is provided at about 0.5%, for example 0.48%, the other gelling agent should be provided at between 0.22% and 0.5% to obtain suitable viscosity and performance. At lower concentrations of the preferred SAP, reduced anode stability is observed. At higher concentrations, increased viscosity interferes with effective anode processing.

From rigorous testing it has been determined that an optimal gelled zinc anode comprises the gelling agent of the present invention at about 0.30% by weight of the anode weight along with 0.48% CARBOPOL 940 cross-linked acrylic acid polymer absorbent. This optimal formulation balances both the desired electrical performance and shock properties of the cell as well as the manufacturing process requirements for placing a gelled anode into an alkaline cell.

In summary, the compounds described in U.S. Pat. No. 4,703,067 are better suited for use as gelling agents in alkaline primary cells than prior gelling agents because they are more readily and inexpensively produced, because they have a more stable three-dimensional structure, and because they provide superior performance and shock resistance. These advantages in a primary alkaline cell would have been unpredictable from the prior teachings which would have required the use of two particular classes of crosslinking agents not used in the present invention and which have been shown herein to be inferior in performance to the gelling agents preferred by the present inventors.

The present invention can be more fully understood by reference to the following examples, which are intended to be exemplary and are not intended in any way to limit the scope of the invention.

EXAMPLES

In the following examples, LR03 (AAA) and LR6 (AA) cells were prepared, as noted, using gelled anodes prepared according to the formulae described below. Common to all the gelled zinc anodes of all cells, unless otherwise noted, were an alkaline electrolyte composed of potassium hydroxide, BIC (Bismuth-Indium-Calcium) zinc powder, water, and surfactant, and indium hydroxide, present at standard concentrations as described above.

The gelling agents included in the gelled zinc anodes of these Examples were varied in composition and in concentration, as is detailed below. The concentrations of other components in the gelled anode were adjusted proportionally. CARBOPOL 940 cross-linked acrylic acid polymer absorbent was purchased from B. F. Goodrich. Some samples contained guar gum as an additional gelling agent.

The following standard abbreviations are used throughout this application:

H.T.=storage conditions, # months at high temperature (130° F. (54° C.), unless noted)

R.T.=storage for # months at room temperature (about 20° C.)

The following standard tests were performed on cells produced:

LR03:LR03 cells prepared using the described gelled anodes were tested in a standard ANSI 3.6 Ohm Photoflash test wherein each tested cell energized an electrical circuit having a 3.6 Ohm load placed thereacross, such load simulating a typical device load. The average number of photoflash discharge cycles (1 cycle=15 second discharge across 3.6 $\Omega$ load per minute) needed to reach an indicated endpoint after storage under the indicated conditions was determined. Throughout this application, if no storage conditions are indicated, the cells were fresh cells kept at room temperature. This test simulates a camera flash application and is predictive of the trend in the industry toward higher current drain ("high rate") applications.

LR6: LR6 cells prepared using the described gelled anodes were tested in a standard ANSI 1.8 Ohm Photoflash test wherein each tested cell energized an electrical circuit having a 1.8 Ohm load placed thereacross, such load simulating a typical device load. The average number of photoflash discharge cycles (1 cycle=15 second discharge across 1.8 $\Omega$ load per minute) needed to reach an indicated endpoint after storage under the indicated conditions was determined. This test simulates a camera flash application and is predictive of the trend in the industry toward higher current drain ("high rate") applications.

This cycle was repeated for each cell until the closed circuit voltage of the cell reached a suitable closed circuit voltage end point, generally 1.1, 1.0 or 0.9 volts. When the final end point was reached, the test for those cells was terminated. The measured value (cycles to end point) is a measure of the cells capacity.

The following test was performed on all cell types:

Drop test: The initial amperage of each cell was measured and recorded at 20° C. Each battery was dropped 5 times from a height of 102 cm. The amperage is checked again on each battery and the "post drop" amperage is compared to the initial amperage. The results are presented as the percentage of the initial amperage. Certain tests also report the percentage of cells having post drop amperage of less than 1 amp. Drop test results represent a measure of the robustness of the zinc network.

The following test was performed on gels prepared as described herein:

Brookfield viscosity test: The Brookfield viscosity of each gel formulation was determined as follows: The electrolyte (37-4 KOH) and gelling agent were mixed and a viscosity was determined. Sixteen hours later, an appropriate amount of zinc was added to form a gelled anode and viscosity was again determined.

To establish a gelling agent concentration range having acceptable performance and shock properties, the gelling agent formulations listed in Table 2 were tested in otherwise standard primary alkaline cells against control primary alkaline cells of the prior art. The test cells were prepared as described elsewhere herein. It is apparent from Table 2 that acceptable gelled anodes were formed when the preferred SAP and CARBOPOL 940 cross-linked acrylic acid polymer absorbent are provided at 0.3% each. When the preferred SAP was used alone at 0.7%, a lower viscosity resulted in separation of the gelled anode.

Tests were made on LR6 cells prepared using 0.38% of the preferred SAP alone as the gelling agent. Control cells were commercial LR6 cells of the prior art. The results of these tests are shown in Table 3. It is apparent from Table 3 that 0.38% of the preferred SAP plus 0.15% PW 150 is in all manner comparable or superior to the control cells.

TABLE 3

|  | Control | 0.38% SAP 0.15% PW 150 |
|---|---|---|
| 1.8 Ohm Photo |  |  |
| 1.10v | 199 | 209 |
| 1.00v | 407 | 419 |
| 0.90v | 613 | 628 |
| 1.8 Ohm Photo (1 H.T.) |  |  |
| 1.10v | 120 | 161 |
| 1.00v | 262 | 290 |
| 0.90v | 553 | 602 |
| 1.8 Ohm Photo (3 R.T.) |  |  |
| 1.10v | 167 | 197 |
| 1.00v | 361 | 373 |
| 0.90v | 609 | 656 |
| Drop Test |  |  |
| Initial Amps | 9.71 | 10.47 |
| Post Amps | 5.3035 | 8.927 |
| % of Initial | 52% | 85% |

The following LR6 cells containing complementary amounts (by weight) of the two gelling agents were tested against control primary alkaline cells of the prior art. Although certain of these test results are acceptable, generally it was observed that drop test, viscosity, and leakage problems were evident at both the lower and higher concentrations of the preferred SAP.

TABLE 4

|  | Control | 0.17% SAP 0.33% Cbpl | 0.33% SAP 0.17% Cbpl |
|---|---|---|---|
| 1.8 Ohm Photo |  |  |  |
| 1.10v | 195 | 198 | 217 |
| 1.00v | 417 | 388 | 371 |
| 0.90v | 637 | 642 | 647 |
| 1.8 Ohm Photo (1 H.T.) |  |  |  |
| 1.10v | 103 | 166 | 189 |
| 1.00v | 276 | 337 | 370 |
| 0.90v | 552 | 630 | 593 |
| Drop Test |  |  |  |
| Initial Amps | 10.646 | 10.304 | 11.696 |
| Post Amps | 6.912 | 3.833 | 10.216 |
| % of Initial | 66% | 37% | 87% |

The identical gelling agent formulations were also tested in LR03 cells and those results are presented in Table 5.

TABLE 5

|  | Control | 0.17% SAP 0.33% Cbpl | 0.33% SAP 0.17% Cbpl |
|---|---|---|---|
| 3.6 Ohm Photo |  |  |  |
| 1.10v | 241 | 252 | 260 |
| 1.00v | 479 | 402 | 400 |
| 0.90v | 632 | 642 | 582 |
| 3.6 Ohm Photo (1 H.T.) |  |  |  |
| 1.10v | 140 | 236 | 195 |
| 1.00v | 364 | 430 | 386 |

TABLE 5-continued

|  | Control | 0.17% SAP 0.33% Cbpl | 0.33% SAP 0.17% Cbpl |
|---|---|---|---|
| 0.90v | 607 | 552 | 552 |
| Drop Test |  |  |  |
| Initial Amps | 6.475 | 7.149 | 7.187 |
| Post Amps | 4.368 | 1.727 | 6.229 |
| % of Initial | 67% | 24% | 88% |
|  |  | 40% <1 Amp |  |

The following Example demonstrates that comparable or superior shock resistance is achieved when the preferred SAP with CARBOPOL cross-linked acrylic acid polymer absorbent is substituted for the prior gelling agent. Also shown is the observation that superior results are achieved at lower viscosity using less of the preferred SAP than the amount of the prior gelling agent used. The control was comparable to a gelled anode of a commercial primary alkaline cell and comprised a predetermined amount of the prior gelling agent of U.S. Pat. No. 4,963,447, 0.10% PW 150 gelling agent, and 0.10% guar gum. A first test gel was identical to the control except that the patented gelling agent was replaced by an equal amount of the preferred SAP. A second test gel, which contained the preferred SAP in place of the prior gelling agent, was formulated to have a viscosity comparable to that of the control by adjusting the concentration of the preferred SAP to 1.20% and proportionally reducing the amount of zinc and electrolyte.

A third test gel, shown herein to be a suitable gelled anode within the scope of the present invention, included the preferred SAP at 0.22% and 0.48% CARBOPOL 940 cross-linked acrylic acid polymer absorbent. For direct comparison to the third test gel, a fourth test gel contained CARBOPOL cross-linked acrylic acid polymer absorbent at 0.48% and the prior gelling agent of U.S. Pat. No. 4,963,447, at 0.22%. Again for comparison to the third test gel, a fifth test gel having a viscosity equal to that of the third test gel, was formulated with 0.48% CARBOPOL cross-linked acrylic acid polymer absorbent and 0.15% of the prior gelling agent in place of the preferred SAP.

The density of each gel was as follows:

| Gel | Density (g/cm$^3$) |
|---|---|
| Control | 2.89 |
| 1 | 2.78 |
| 2 | 2.71 |
| 3 | 2.85 |
| 4 | 3.01 |
| 5 | 2.97 |

A drop test performed on LR6 cells prepared with each formula demonstrated superior shock sensitivity of cells within the scope of the present invention. Generally, gels formulated with CARBOPOL cross-linked acrylic acid polymer absorbent and the preferred SAP to be like the control gel had higher amperages, and higher amperage retention, than cells containing gels using the prior gelling agent that were designed to be like test gel 3. However, in each case the presence of the preferred SAP yielded superior results, as is shown in Table 6.

TABLE 6

| Gel Variation | Initial Amps | Post Amps | % Initial |
|---|---|---|---|
| Control | 10.598 | 8.117 | 77% |
| 1 | 10.983 | 10.094 | 92% |
| 2 | 10.857 | 9.839 | 91% |
| 3 | 7.864 | 3.782 | 48% |
| 4 | 9.669 | 3.519 | 36% |
| 5 | 8.821 | 3.575 | 40% |

The following Example demonstrates that in gels and in LR6 cells containing a constant amount of CARBOPOL 940 cross-linked acrylic acid polymer absorbent (0.48%) in the anode, the preferred SAP at 0.30% in the anode elicits performance comparable or superior to gels and cells that contain an equivalent amount (0.30%) of the prior gelling agent, and to gels and cells that contain an amount of the prior gelling agent (0.23%) calculated to yield an equivalent viscosity to that of the cells containing CARBOPOL 940 cross-linked acrylic acid polymer absorbent and the preferred SAP.

TABLE 7

| | | | |
|---|---|---|---|
| CARBOPOL cross-linked acrylic acid polymer absorbent | 0.48% | 0.48% | 0.48% |
| SAP | 0.30% | 0 | 0 |
| Prior Gell. agent | 0 | 0.30% | 0.23% |
| Viscosity (cps) | | | |
| Gelled Electrolyte | 20,000 | 28,400 | 24,000 |
| Gelled Anode | 32,400 | 41,200 | 35,200 |
| 1.8 Ohm Photo | | | |
| 1.10v | 194 | 152 | 122 |
| 1.00v | 412 | 360 | 309 |
| 0.90v | 615 | 570 | 547 |
| DROP TEST | | | |
| Initial Amps | 11.747 | 10.617 | 10.401 |
| Post Amps | 5.461 | 2.842 | 3.763 |
| % of Initial | 46% | 27% | 36% |

The present invention is not intended to be limited to the exemplified embodiments, but rather to encompass all such variations and modifications as come within the scope of the following claims.

We claim:

1. A gelled anode for use in an alkaline electrochemical cell, the gelled anode comprising:

an aqueous alkaline electrolyte;

an effective amount of a zinc powder; and a potassium polyacrylate superabsorbent polymer gelling agent formed by combining potassium acrylate and a polyvinyl monomer in a combined amount of 55 to 80 weight percent with water to form a monomer mixture then adding a polymerization initiator to the monomer mixture to initiate modified bulk polymerization of the monomer mixture.

2. A gelled anode for use in an alkaline electrochemical cell, the gelled anode comprising:

an aqueous alkaline electrolyte;

an effective amount of a zinc powder; and a potassium polyacrylate superabsorbent polymer gelling agent characterized as a white, odor-free powder that is insoluble in the electrolyte and having a typical bulk density of 0.4, an absorption capacity of 27+10 grams of saline per gram, a maximal moisture content of 8%, 600 or fewer ppm of residual acrylate monomer, and a particle size distribution of between 135 and 850 microns.

3. A gelled anode as claimed in claim 1 wherein the electrolyte comprises potassium hydroxide.

4. A gelled anode as claimed in claim 1 wherein the zinc powder contains 1% or less by weight of mercury.

5. A gelled anode as claimed in claim 4 wherein the zinc powder contains no added mercury.

6. A gelled anode as claimed in claim 1 wherein the zinc powder contains no added lead.

7. A gelled anode as claimed in claim 1 wherein the zinc powder comprises bismuth, indium and calcium.

8. A gelled anode as claimed in claim 1 further comprising indium hydroxide in an amount effective to promote electrical conductivity and to reduce corrosion.

9. A gelled anode as claimed in claim 1 further comprising a surfactant in an amount effective to reduce gassing in an alkaline electrochemical cell comprising the gelled anode.

10. A gelled anode as claimed in claim 1 wherein the polymer gelling agent comprises carboxyl groups and wherein at least about 50% of the carboxyl groups are free acids.

11. A gelled anode as claimed in claim 1 wherein the polymer gelling agent is thermally stable when heated to a temperature of 230° C.

12. A gelled anode as claimed in claim 1 wherein less than about 50% of the polymer gelling agent decomposes when heated to a temperature of 700° C.

13. A gelled anode as claimed in claim 1 wherein the polymer gelling agent is present at between 0.22 and 1.1% by weight of the gelled anode.

14. A gelled anode as claimed in claim 1 wherein the polymer gelling agent is present at between 0.7 and 1.0% by weight of the gelled anode.

15. A gelled anode as claimed in claim 1 wherein the polymer gelling agent is present at between 0.8 and 0.9% by weight of the gelled anode.

16. An alkaline electrochemical cell comprising:

a positive current collector;

a cathode in contact with the positive current collector;

a gelled zinc anode inside the cathode, the anode comprising an aqueous alkaline electrolyte, an effective amount of a zinc powder, and a potassium polyacrylate superabsorbent polymer gelling agent formed by combining potassium acrylate and a polyvinyl monomer in a combined amount of 55 to 80 weight percent with water to form a monomer mixture then adding a polymerization initiator to the monomer mixture to initiate modified bulk polymerization of the monomer mixture;

a separator between the cathode and the anode; and a negative current collector in electrical contact with the anode.

17. An alkaline electrochemical cell comprising:

a positive current collector;

a cathode in contact with the positive current collector;

a gelled zinc anode inside the cathode, the anode comprising an aqueous alkaline electrolyte, an effective amount of a zinc powder, and a potassium polyacrylate superabsorbent polymer gelling agent characterized as a white, odor-free powder that is insoluble in the electrolyte and having a typical bulk density of 0.4, an absorption capacity of 27+10 grams of saline per gram, a maximal moisture content of 8%, 600 or fewer ppm of residual acrylate monomer, and a particle size distribution of between 135 and 850 microns;

a separator between the cathode and the anode; and a negative current collector in electrical contact with the anode.

18. An alkaline electrochemical cell as claimed in claim 16 wherein the electrolyte is potassium hydroxide.

19. An alkaline electrochemical cell as claimed in claim 16 wherein the zinc powder contains 1% or less by weight of mercury.

20. An alkaline electrochemical cell as claimed in claim 19 wherein the zinc powder contains no added mercury.

21. An alkaline electrochemical cell as claimed in claim 16 wherein the zinc powder contains no added lead.

22. An alkaline electrochemical cell as claimed in claim 16 wherein the zinc powder comprises bismuth, indium and calcium.

23. An alkaline electrochemical cell as claimed in claim 16 further comprising indium hydroxide in an amount effective to promote electrical conductivity and to reduce corrosion.

24. An alkaline electrochemical cell as claimed in claim 16 further comprising a surfactant in an amount effective to reduce gassing in an alkaline electrochemical cell comprising the alkaline electrochemical cell.

25. An alkaline electrochemical cell as claimed in claim 16 wherein the polymer gelling agent comprises carboxyl groups and wherein at least about 50% of the carboxyl groups are free acids.

26. An alkaline electrochemical cell as claimed in claim 16 wherein the polymer gelling agent is thermally stable when heated to a temperature of 230° C.

27. An alkaline electrochemical cell as claimed in claim 16 wherein less than about 50% of the polymer gelling agent decomposes when heated to a temperature of 700° C.

28. An alkaline electrochemical cell as claimed in claim 16 wherein the polymer gelling agent is present at between 0.22 and 1.1% by weight of the alkaline electrochemical cell.

29. An alkaline electrochemical cell as claimed in claim 16 wherein the polymer gelling agent is present at between 0.7 and 1.0% by weight of the alkaline electrochemical cell.

30. An alkaline electrochemical cell as claimed in claim 16 wherein the polymer gelling agent is present at between 0.8 and 0.9% by weight of the alkaline electrochemical cell.

31. A method for forming a gelled anode, the method comprising the steps of:

combining potassium acrylate and a polyvinyl monomer in a combined amount of 55 to 80 weight percent with water to form a monomer mixture;

adding a polymerization initiator to the monomer mixture to initiate modified bulk polymerization of the monomer mixture to form a potassium polyacrylate superabsorbent polymer gelling agent characterized as a white, odor-free powder that is insoluble in the electrolyte and having a typical bulk density of 0.4, an absorption capacity of 27+10 grams of saline per gram, a maximal moisture content of 8%, 600 or fewer ppm of residual acrylate monomer, and a particle size distribution of between 135 and 850 microns;

mixing together an aqueous alkaline electrolyte and the polymer gelling agent in suitable quantity to form a gelled electrolyte;

mixing a suitable amount of a zinc powder into the gelled electrolyte to form a gelled anode.

32. A method as claimed in claim 31, further comprising the step of adding indium hydroxide to the gelled electrolyte in an amount effective to promote electrical conductivity and to reduce corrosion.

33. A method as claimed in claim 31, further comprising the step of adding a surfactant to the gelled electrolyte in an amount effective to reduce gassing in an alkaline electrochemical cell comprising the gelled anode.

34. A method for forming an alkaline electrochemical cell, the method comprising the steps of:

placing a cathode into a positive current collector open on one end so that the positive current collector contacts the cathode;

introducing a separator so that the separator contacts the cathode;

introducing a gelled anode comprising an aqueous alkaline electrolyte, an effective amount of a zinc powder, and a potassium polyacrylate superabsorbent polymer gelling agent characterized as a white, odor-free powder that is insoluble in the electrolyte and having a typical bulk density of 0.4, an absorption capacity of 27 grams of saline per gram, a maximal moisture content of 8%, 600 or fewer ppm of residual acrylate monomer, and a particle size distribution of between 135 and 850 microns, so that the gelled anode contacts the separator; and placing a negative current collector into the open end of the container so that the negative current collector contacts the gelled anode.

35. A method for discharging an alkaline electrochemical cell, the method comprising the steps of:

providing an alkaline electrochemical cell having a positive terminal and a negative terminal, the cell comprising a gelled zinc anode comprising an aqueous alkaline electrolyte, an effective amount of a zinc powder, and a potassium polyacrylate superabsorbent polymer gelling agent characterized as a white, odor-free powder that is insoluble in the electrolyte and having a typical bulk density of 0.4, an absorption capacity of 27 grams of saline per gram, a maximal moisture content of 8%, 600 or fewer ppm of residual acrylate monomer, and a particle size distribution of between 135 and 850 microns; and providing a resistance between the positive terminal and the negative terminal.

* * * * *